Figure 1:
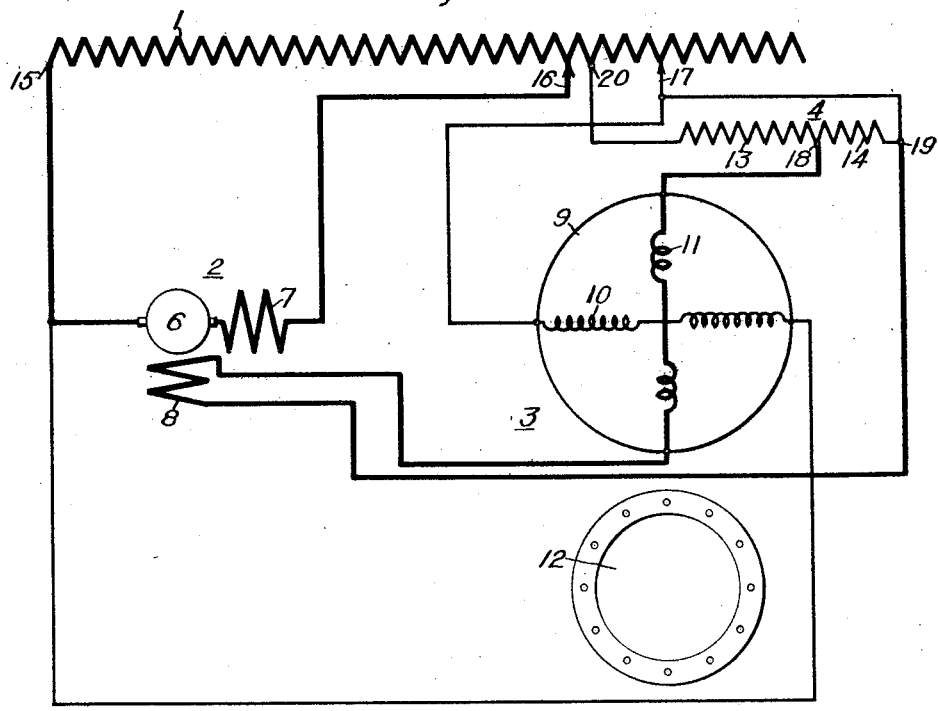

Mar. 13, 1923.

J. M. LABBERTON.
REGENERATION OF SINGLE PHASE MOTORS.
FILED SEPT. 13, 1919.

1,448,410.

WITNESSES:
J.A.Helsel
W.R.Coley

INVENTOR
John M. Labberton.
BY
Wesley G. Carr
ATTORNEY

Patented Mar. 13, 1923.

1,448,410

UNITED STATES PATENT OFFICE.

JOHN M. LABBERTON, OF WILKINSBURG, PENNSYLVANIA, ASSIGNOR TO WESTINGHOUSE ELECTRIC & MANUFACTURING COMPANY, A CORPORATION OF PENNSYLVANIA.

REGENERATION OF SINGLE-PHASE MOTORS.

Application filed September 13, 1919. Serial No. 323,575.

*To all whom it may concern:*

Be it known that I, JOHN M. LABBERTON, a citizen of the United States, and a resident of Wilkinsburg, in the county of Allegheny and State of Pennsylvania, have invented a new and useful Improvement in Regeneration of Single-Phase Motors, of which the following is a specification.

My invention relates to systems of control for dynamo-electric machines, and particularly to the regulation of alternating current commutator motors of the single-phase type during regenerative periods.

More specifically considered, my invention is included in that class of systems wherein a phase-converter is employed in conjunction with a section of the supply transformer for supplying energy of the proper phase relation to the exciting field winding of a single-phase motor during regenerative periods, in the prior art of which I have knowledge, as represented, for example, by a copending application of Lawrence M. Perkins, Serial No. 273,082, filed January 25, 1919, and assigned to the Westinghouse Electric & Manufacturing Company, a section of the main supply transformer has been directly connected in circuit with the exciting field winding of the single-phase motor and with the generating winding of the phase-converter, to supply the desired corrective component to the motor-field circuit as the speed of the locomotive or other vehicle decreases during the braking period. Such direct connection to the supply transformer for furnishing what may be termed the right-angle component, as more fully described hereinafter, is satisfactory as long as the ratio of transformation of the phase-converter windings is unity. However, it will be appreciated that, when it is desired to employ a phase-converter having a converting ratio materially greater than unity such as 4 to 1, for example, the above-mentioned arrangement is not feasible, since the necessary variation of the above-mentioned right-angle component would require the use of a relatively small section of the supply transformer, and complicated and expensive switching arrangements would be necessary to prevent too great a variation in the right-angle component under consideration.

Broadly stated, therefore, the object of my present invention is to provide an arrangement in a system of the above-indicated character, whereby a phase-converting ratio of any desired value may be readily and reliably employed, while maintaining the desired variation of the right-angle component within relatively narrow limits.

More specifically stated, it is the object of my invention to interpose, between the supply transformer and the low-voltage winding of a phase-converter in a system of the class in question, an auto-transformer, the low-voltage portion of which is connected across the circuit including the exciting field winding of the single-phase motor and the low-voltage generating winding of the phase-converter, the ratios of transformation of the phase-converter windings and of the auto-transformer being substantially the same.

Figure 2:
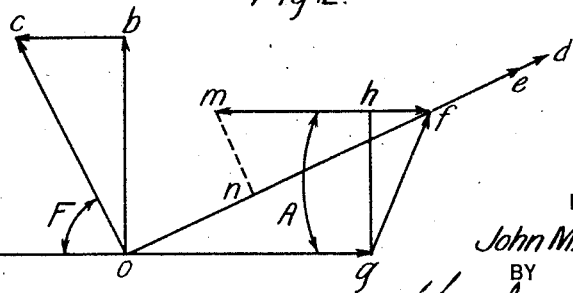

My invention may best be understood by reference to the accompanying drawing, wherein Fig. 1 is a diagrammatic view of the essential circuits to a system of control organized in accordance with the present invention, and Fig. 2 is a vector diagram graphically setting forth the relations of various electrical quantities during the regenerative operation of the system illustrated in Fig. 1.

Referring to Fig. 1, the system here shown comprises a suitable supply-transformer winding 1 for supplying energy to a single-phase commutator-type motor 2 and a cooperating phase-converter 3, with which is associated an auxiliary or auto-transformer 4 for the purpose already set forth.

The single-phase motor 2 comprises a commutator-type armature 6, a conductively-connected compensating or inducing field winding 7 and a main or exciting field winding 8.

The illustrated phase-converter 3 is of the two-phase type, comprising a primary high-voltage or exciting winding 10 and a quadrature-related low-voltage or generating winding 11 that are located on the stator, together with a squirrel-cage rotor 12. Inasmuch as this type of phase-converter is well-known to those skilled in the art, no further description or explanation of the operation thereof is deemed necessary here.

The ratio of transformation of the phase-converter windings 10 and 11 is assumed, in the present case, as 4 to 1, although it should be understood that my present invention may be readily applied in connection with phase-converters of any other desired ratio.

The auto-transformer 4 is divided into a high-voltage section 13 and a low voltage section 14, the entire transformer being energized from the main supply transformer 1, while the low-voltage section 14 is connected to furnish energy to the exciting field winding circuit of the single-phase motor 2, as about to be traced in detail.

The ratio of transformation of the auto-transformer, that is to say, the number of turns in the entire winding 4 with respect to those in the low-voltage section 14, bears the ratio of 4 to 1, in the present instance, which is the same as the step-down ratio of the phase-converter windings 10 and 11. It will be understood, therefore, that, whatever the converting ratio of the phase-converter 3, the ratio of the auto-transformer may be correspondingly adjusted by shifting the middle tap of the transformer, so that my invention may thus be very readily adapted for use with a phase-converter having any given ratio of transformation.

Referring to the electrical connections of the various illustrated windings, the armature 6 and the inducing field-winding 7 of the single-phase motor 2 are connected between the left-hand terminal 15 of the supply transformer 1 and an intermediate movable tap 16. The primary or high-voltage winding 10 of the phase-converter 3 is connected across the portion of the supply transformer that is included between the terminal 15 and a second movable tap 17 that is located near the right-hand end of the supply-transformer coil. An intermediate tap-point 18, marking the dividing line between the high-voltage section 13 and the low-voltage section 14 of the auto-transformer 4, is connected through the low-voltage or generating winding 11 of the phase-converter 3 and the exciting field-winding 8 of the single-phase motor 2 to the right-hand terminal 19 of the auto-transformer, which, considered as a single winding, is connected between the movable tap 17 and a permanent intermediate tap 20 on the supply transformer 1.

The operation of the present invention is graphically set forth in the vector diagram of Fig. 2, wherein—

$oa$ = the supply-transformer voltage that is applied to the exciting or primary stator winding 10 of the phase-converter;

$ob$ = the quadrature-related voltage that is set up at the terminals of the low-voltage or generating stator winding 11 of the phase-converter;

$bc$ = the voltage across the low-voltage section 14 of the auto-transformer 4 that is connected in series relation with the generating winding of the phase-converter. The vector $bc$ is the right-angle component to which reference has been previously made;

$oc$ = the resultant of the quadrature-related voltages $ob$ and $bc$, which is applied to the exciting field-winding 8 of the regenerating machine 2;

$F$ = the phase angle between the exciting field voltage and the supply-transformer voltage which angle may be varied to change the torque or tractive effort of the regenerating machine;

$od$ = the quadrature-related current that is set up in the exciting field winding 8 by the voltage $oc$;

$oe$ = the flux produced in the machine air gap by the exciting field current $od$;

$of$ = the counter-electromotive force which is set up in the armature 6 as a result of the armature conductors cutting the flux $oe$ when the armature is driven by some external force which, in the case of regeneration, is the momentum of the motor and the associated vehicle;

$og$ = the voltage across that section of the main transformer winding to which the armature 6 is connected;

$fg$ = the vector difference between the counter-electromotive force or generated armature voltage $of$ and the supply-transformer voltage $og$. When the armature is operatively connected to the transformer winding, the vector $fg$ represents the impedance drop in the entire circuit. This impedance drop is composed of $fh$, which equals the resistance drop in the armature circuit, the armature current $fm$ being in phase with this vector, and a reactance drop $gh$ at right angles to the resistance drop $fh$. Consequently, $fh$ = the resistance drop in the armature circuit;

$gh$ = the reactance drop in the armature circuit; and $fm$ = the total armature current.

$fn$ = the component of the armature current that is located 180° out of phase with the exciting field current $od$, and is obtained from the total armature current vector $fm$ by dropping a perpendicular $mn$ upon the field current vector $od$. Since the product of armature current and field flux, taking into account, also, the angular relation thereof, gives a measure of the regenerative torque, it follows that the product of the vectors $fn$ and $oe$ at all times, provides this measure, that is, it is always proportional to the regenerative torque.

$A$ = the phase angle between the armature current and the supply-circuit voltage. In Fig. 2, the vectors $fm$ and $og$ are represented as parallel, corresponding to 100% power-factor, which figure will usually be desired in actual operation.

The voltage $oa$ that is applied to the primary phase-converting winding 10 may be increased during the retardation period as the vehicle speed decreases, by shifting the transformer tap 17 towards the right. This action correspondingly increases the quadrature-related voltage $ob$ of the generating phase-converter winding. Unless the right-angle component $bc$, which is derived from the supply transformer 1, is also increased, the phase angle F, which gives a measure of the regenerative machine torque, will be greatly increased as the resultant vector $oc$ approaches a vertical position. For this reason, it is necessary to increase the right-angle component $bc$ as the primary converter voltage $oa$ is increased, in order to maintain the desired phase angle F and, therefore, the proper regenerative torque.

However, as previously mentioned, it is not feasible to obtain the right-angle component voltage directly from the supply-transformer winding 1 whenever the converting ratio of the phase-converter windings is larger than unity. By providing the auxiliary transformer 4, having a ratio of transformation equal to that of the phase-converter windings, the proper value of the right-angle component $bc$ may be readily maintained, and the same angle F between the exciting field voltage and the line voltage obtains as would be the case if the right-angle component $bc$ were obtained directly from the main transformer winding 1.

I do not wish to be restricted to the specific circuit connections or arrangements of parts herein set forth, as various modifications thereof may be effected, without departing from the spirit and scope of my invention. I desire, therefore, that only such limitations shall be imposed as are indicated in the appended claims.

I claim as my invention:

1. In an alternating-current regenerative system, the combination with a supply transformer and a dynamo-electric machine having an armature and a field winding, of a phase-converter having two independent phase windings, one being connected to excite said field winding, said phase-converter having a converting ratio other than unity, and step-up transformer means for connecting one terminal of the lower-voltage converter winding to an intermediate point of said supply transformer.

2. In an alternating-current regenerative system, the combination with a supply transformer and a dynamo-electric machine having an armature and a field winding, of a phase-converter connected to excite said winding and having a converting ratio other than unity, and an auxiliary transformer connected to apply to one of the converter windings a voltage changed in a ratio substantially equal to that of the phase-converter windings.

3. In an alternating-current regenerative system, the combination with a supply transformer and a dynamo-electric machine having an armature and a field winding, of a phase-converter energized from said transformer and having a step-down winding connected to excite said field winding, and a step-up transformer interposed between the field-winding circuit and the supply transformer, the ratio of transformation in said phase-converter and said step-up transformer being substantially the same.

4. In an alternating-current regenerative system, the combination with a supply transformer and a dynamo-electric machine having an armature and a field winding, of a phase-converter having a step-down generating winding, said field winding being energized from said generating winding and a section of said transformer, and means associated with said generating winding for maintaining the necessary variation of the voltage derived from said transformer section during regenerative machine operation within relatively narrow limits.

5. In an alternating-current regenerative system, the combination with a supply transformer and a dynamo-electric machine having an armature and a field winding, of a phase-converter having a step-down generating winding, said field winding being energized from said generating winding and a section of said transformer, and an auxiliary step-up transformer energized from the supply transformer and having its low-voltage portion connected to the field-winding circuit.

6. In an alternating-current regenerative system, the combination with a supply transformer and a dynamo-electric machine having an armature and a field winding, of a phase-converter having a step-down generating winding, said field winding being energized from said generating winding and a section of said transformer, and an auxiliary step-up transformer energized from the supply transformer and having its low-voltage portion connected to the field-winding circuit, the step-down ratios of the converter and the auxiliary transformer being substantially the same.

7. In an alternating-current regenerative system, the combination with a supply transformer and a dynamo-electric machine having an armature and a field winding, of a phase-converter having an exciting winding connected across a portion of said transformer and having a generating winding connected in circuit with said field winding, the ratio of the exciting winding turns to the generating winding turns being greater than unity, and an auto-transformer connected across a section of the supply transformer, the circuit including said generating winding and said field winding being connected across a portion of said auto-transformer, the step-down ratios of the converter and the auto-transformer being substantially the same.

In testimony whereof, I have hereunto subscribed my name this 3rd day of Sept., 1919.

JOHN M. LABBERTON.